US007000962B2

(12) United States Patent  (10) Patent No.: US 7,000,962 B2
Le  (45) Date of Patent: Feb. 21, 2006

(54) STICK-ON HANDLE FOR BOXES AND CONTAINERS

(76) Inventor: Andrew Dung The Le, 3358 Gavota Ave, San Jose, CA (US) 95124

( * ) Notice: Subject to any disclaimer, the term of this patent is extended or adjusted under 35 U.S.C. 154(b) by 0 days.

(21) Appl. No.: 10/281,771

(22) Filed: Oct. 26, 2002

(65) Prior Publication Data

US 2004/0222651 A1  Nov. 11, 2004

(51) Int. Cl.
  *B65G 7/12*  (2006.01)
(52) U.S. Cl. .................. 294/15; 294/27.1; 220/757
(58) Field of Classification Search .............. 294/15, 294/27.1; 16/407, 425; 229/117.23; 220/752, 220/757; 215/396
  See application file for complete search history.

(56) References Cited

U.S. PATENT DOCUMENTS

| 1,492,100 | A | * | 4/1924 | Krueger | 229/117.26 |
| 4,119,268 | A | * | 10/1978 | Segura | 383/21 |
| 5,647,624 | A | * | 7/1997 | Beshara, Jr. | 294/27.1 |
| 6,217,091 | B1 | * | 4/2001 | Whitney | 294/15 |
| 6,315,191 | B1 | * | 11/2001 | Willis | 229/117.23 |
| 6,375,239 | B1 | * | 4/2002 | Reed et al. | 294/27.1 |

* cited by examiner

*Primary Examiner*—Dean J. Kramer
(74) *Attorney, Agent, or Firm*—Theresia C. Sandhu; Law Office of Theresia C. Sandhu

(57) ABSTRACT

A handle-frame set for attachment to a container or a bulky object to facilitate lifting and carrying of said container or bulky object, comprising a frame part and a handle part with the resultant handle formed by displacement of the lower portion of the frame part whereby the formed handle is locked into position. An adhesive layer for attaching to a surface is affixed on the back side of the frame part and the handle part and a protective layer is releaseably affixed to the back side of the adhesive layer.

3 Claims, 7 Drawing Sheets

STICK-ON HANDLE FOR BOXES AND CONTAINERS

RELATED APPLICATIONS

None

FIELD OF THE INVENTION

This invention relates to a stick-on handle-frame set for boxes, containers, or any large, bulky item that has smooth surfaces and therefore is difficult to grab, specifically to an improved handle mechanism attachable to any such box, container, or bulky item.

BACKGROUND OF THE INVENTION

Corrugated cardboard boxes of all sizes are commonly used throughout industry to hold quantities of items, archive documents, ship merchandise, etc. Private use of corrugated cardboard boxes is widespread. These boxes are especially useful because they tend to come in standard sizes and provide convenient storage for all manner of items. The sizes range from a small box which can be easily carried in one hand to large 3'×3'×4' moving boxes designed to hold bulky items such as bedspreads, pillows, etc.

When a corrugated cardboard box is filled up, even if it is not heavy, it is bulky and very difficult to lift or move because there is no handle. The box must be grasped from the sides and bottom, lifted and allowed to rest against the chest, arms or shoulders of the person or persons carrying it. Cardboard box manufacturers have addressed this problem by making slot-like cutouts on opposite sides of the container to create places for the hands to grab. However this solution does not solve the problem: the weight of the box and its contents causes the slots to tear at the edges after being used several times. The tears propagating into the side of the container render the slot useless for grasping, and destroy the integrity of the container itself.

Many boxes or containers do not allow for any cutout on the sides due to the liquid or powder material contained inside. A variety of attachable handles are disclosed in the patent Literature as attachable devices to facilitate the handling of boxes. Many of them are mechanical devices. Only one device uses adhesive as the means of attachment to the box.

U.S. Pat. No. 6,315,191 B1 to Jimmy Keith Willis (2001) discloses a cardboard handle designed for cardboard boxes using an adhesive to secure the handle system to the cardboard box. This handle system consists of a handle and two reinforcement pieces. The handle is a large sheet of cardboard having the same height as the cardboard box, which is glued onto and wraps around the cardboard box. Cutouts on the portions of the handle which attach to opposing sides of the box provide handholds. Two reinforcement pieces cut in the same shape as the cutouts are glued and aligned onto the cutouts to strengthen the handholds. In order for a person to grasp the cutouts, the box must be assembled into its final shape and closed. The disadvantages of this invention are that it is box-specific and consequently more costly to manufacture, difficult to mount and operate, and lacking in sufficient strength to support heavier loads.

U.S. Pat. No. 4,850,502 to James B. Davis (1989) discloses a detachable plastic molded handle system for use with containers having a smooth surface. This device includes a set of loop and hook fasteners, commonly known as a Velcro fastener. The hook and loop parts of the fastener are mounted onto the surface of the container and onto the handle, respectively, using adhesive. The contact formed between the hook and loop results in bonds that resist the shear force created when the container is lifted up. This handle assembly is a sophisticated design using: adhesive, Velcro fasteners and a plastic molded handle. This multi-part assembly is expensive to manufacture. The detachable plastic molded handle may easily be lost, rendering the entire system useless. The holding strength of the handle system depends on the bonds generated by the hooks and loops of the Velcro fastener. Successful use of the handle system requires a skillful, experienced operator to align the portions of the system so that the full capabilities of the system are utilized. Misalignment would result in dropping of the box and its contents with resultant injury to the person or box contents. Further, the portion of the assembly attached to the box itself creates a surface topography which interferes with the close juxtaposition of boxes as would be required when stacking them.

In searching for a solution to facilitate storage of goods and the handling of bulky boxes or containers, container manufacturers have devised stackable trays, modular systems, nesting boxes and the like. However, corrugated cardboard boxes have become ubiquitous. They are so popular that they are used in offices, factories and in almost every home. However, there is no simple, readily available, easily implementable handle assembly suitable for a variety of users of varying mechanical abilities.

SUMMARY OF THE INVENTION

It is an object of the invention to provide a device that is attachable to a box, a container, any bulky object or the like having surfaces capable of attachment by adhesive to facilitate the lifting, carrying, moving, handling of the said box, container, bulky object or the like.

It is another object of the invention that the device is quickly and easily attachable to any box, container, bulky object or the like made of corrugated cardboard, wood, plastic, plastic composite, glass, fiber composite, popular metals (aluminum, stainless steel, alloy), painted metal or the like.

It is another object of the invention that the device can be used immediately after mounting.

It is another object of the invention that the device may be made of any suitable material including but not limited to corrugated cardboard, wood, plastic, plastic composite, glass, fiber composite, metals (aluminum, stainless steel, alloy), or painted metal. The handle part and the frame part of the device may be made from the same material or from different materials depending on the particular application. In one embodiment, the handle may be plastic rope looped inside small diameter tubing attached to a corrugated cardboard frame. Further, the materials of which the device is made may be the same or different than the materials of the box or container to which the device is attached. For example, a plastic handle-frame set can be applied onto a wooden box of proper size and weight or vice versa.

It is another object of the invention that the device adds a minimum amount of additional weight to the container.

It is another object of the invention that the device capability and performance is proportional to the number of devices being used: for example, four devices attached to a container or bulky object would support twice the weight that two devices would support.

It is another object of the invention that a multiplicity of devices attached to a container or the like will enable more than one person to lift or carry the container or bulky object.

Advantages of the present invention are that it may be easily and economically made from inexpensive materials. The materials chosen may be biodegradable. Attachment of the invention to the outer portion of a box or container does not require that the integrity of the container be compromised. The contents of the container are not subject to spilling, escape or contamination.

The same concept is used in the following variations of the handle-frame set device which offer different advantages for different circumstances. A first embodiment is a handle-frame set device with the handle part and the frame part made out of the same material with the handle part extending outwardly from the container to which it is attached and forming a triangular shape. The first alternative embodiment is a handle-frame set device using small diameter tubing and a plastic rope as the handle. The handle may be sufficient in length to allow grasping by hand or may be elongated so that the loop formed by the handle may allow for the insertion of a pole or other similar stick-like device between the handle loops such that more than one container with the invention attached may be transported at one time. The second alternative embodiment is a handle-frame set device using a plastic reinforcing piece with four holes.

Embodiments of the invention made out of inflexible or hard material such as wood, molded plastic or metal, have the final manufactured shape and need not be formed or assembled by the user. Consequently final assembly requires that the adhesive tape be cut to conform to the shape and size of the frame and applied to the invention. The function of the invention is not altered by the modification in the assembly of the finished invention as illustrated here.

Accordingly, this invention offers the public a handle system attachable to boxes, containers and bulky objects that will make the handling of these items easier and safer. The invention offers the following advantages over present handle inventions: reliability and safety, simplicity of use, ease of manufacture, low cost, minimal increase in overall weight of container. Further, the invention may be made of recyclable and biodegradable materials, thus reducing environmental concerns.

The scope of the invention should be determined by the appended claims and their legal equivalents, rather than by the examples given.

BRIEF DESCRIPTION OF THE DRAWINGS

The present invention is illustrated by way of example and not limitation in the figures of the accompanying drawings. Other features and advantages of the present invention will become apparent in the following detailed description with reference to the accompanying drawings, in which.

DESCRIPTION

As will be described in more detail below, a handle-frame set for attaching to boxes, containers and bulky objects for the purpose of enabling easy transport is described.

One embodiment of the present invention is shown in FIGS. 1A–1D. The frame part of the handle-frame set may be made out of corrugated cardboard, wood, plastic, plastic composite, glass, fiber composite, popular metals (aluminum, stainless steel, alloy) or painted metal or the like. A particularly useful material is corrugated cardboard because of its lightweight, formability, strength and low cost. Using processes known in the art, adhesive transfer tape is applied onto the back of sheets of suitable materials by means of a laminating machine. The sheets are subsequently processed in a cutting machine to be cut into proper shapes and to create folding lines. The manufacturing process described herein is applicable to any of the above mentioned materials but is especially appropriate to corrugated cardboard.

Description

Figure 1A:
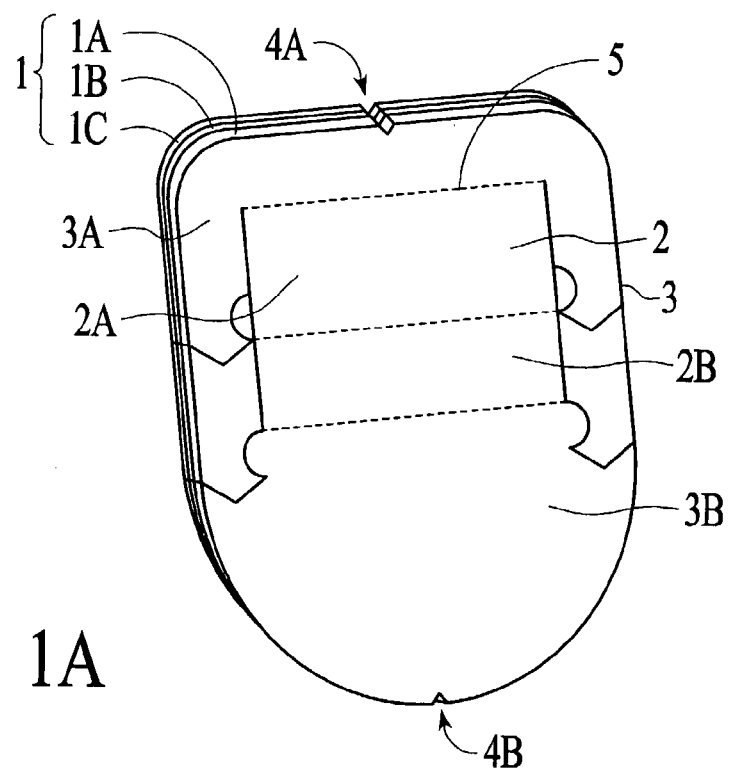
FIG. 1A is a view of a preferred embodiment of the present invention prior to formation and attachment to a container.

FIGS. 1A through 1D illustrate the assembly of a first embodiment of the invention. Referring to FIG. 1A a first embodiment of a handle-frame set 1 according to the present invention is shown prior to formation and attachment to a container or bulky object. The handle-frame set embodiment shown is made of a corrugated cardboard 1A backed by an adhesive layer 1B. A protective layer 1C may be applied to allow the handle frame set 1 to be manipulated prior to attachment. Handle-frame set 1, consists of a handle part 2 and a frame part 3, each having an upper portion 2A and 3A and a lower portion 2B and 3B. The handle part 2 and the frame part 3 each have positioning notches 4A and 4B to aid in positioning the handle frame assembly on a container as shown in FIG. 2. The handle frame set 1 is scored along lines 5 to facilitate the folding of the Handle Part 2.

Figure 1B:
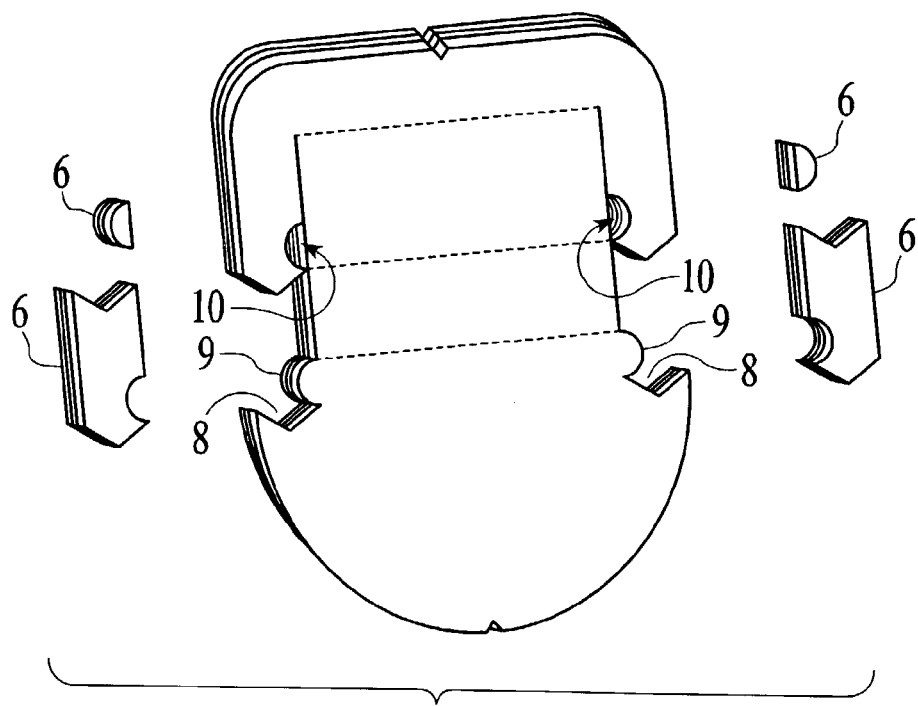
FIG. 1B is an exploded view of the embodiment in FIG. 1A showing the cutaway portions removed.
Figure 2:
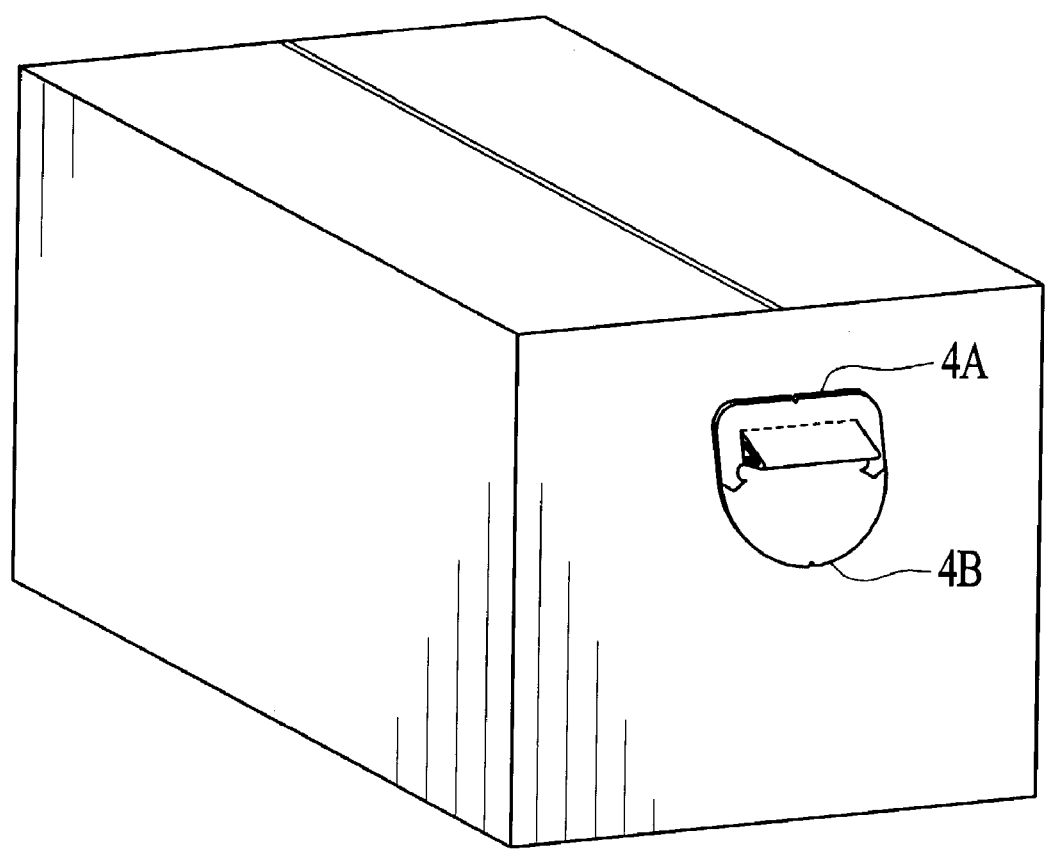
FIG. 2 shows the embodiment of the invention shown in FIG. 1D as mounted on a container.

FIG. 1B illustrates the second step in the assembly where the cut away portions 6 are discarded to expose aligning keys 7, aligning sockets 8, aligning shapes 9 and aligning holes 10. The shapes of aligning keys 7, aligning sockets 8, aligning shapes 9 and aligning holes 10 are illustrative only and may be any combination of shapes that allow the juxtaposition of aligning keys 7 with aligning sockets 8 and the juxtaposition of aligning shapes 9 with aligning holes 10 such that aligning holes 10 hold aligning shapes 9 securely in place.

Figure 1C:
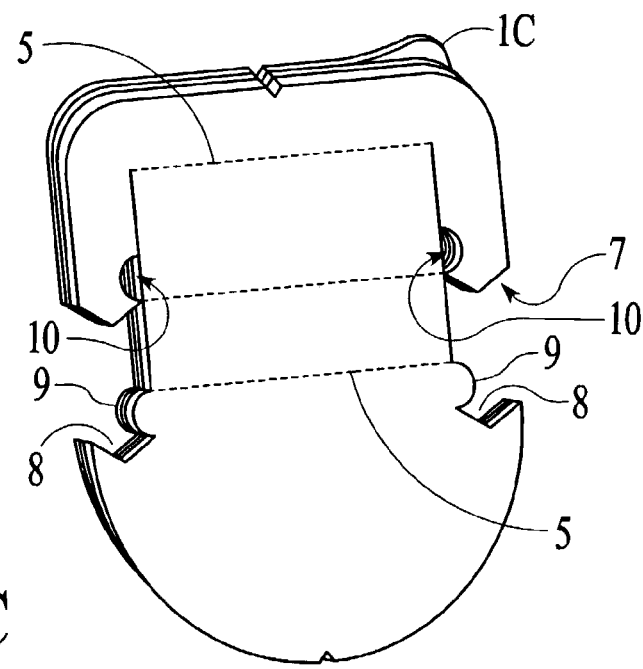
FIG. 1C shows the preferred embodiment ready for assembly.
Figure 1D:
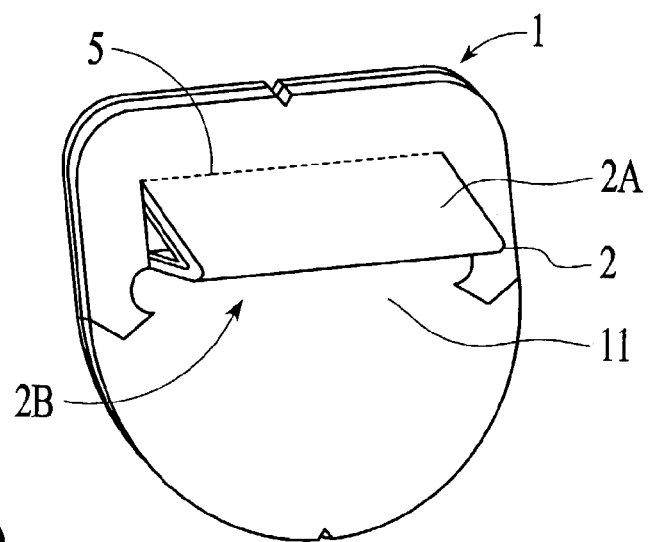
FIG. 1D shows the preferred embodiment after formation and ready for mounting onto the vertical side of a container.

FIG. 1C and FIG. 1D illustrate the third and fourth steps in the assembly. The protective layer 1C shown in FIG. 1C is removed and discarded. The Handle part 2 is formed by bending at the scored lines 5 and placing the aligning shapes 9 in the aligning holes 10 while fitting the aligning keys 7 in juxtaposition with aligning sockets 8. The upper portion 2A of handle part 2 extends upwardly and outwardly and the lower portion 2B extends upwardly and inwardly to form a handle 11 suitable for grasping. The Handle Frame Set 1 may then be affixed to an object such as the container illustrated in FIG. 2.

The embodiments as shown illustrate the use of one pair of handle frame sets applied to the vertical sides of a container. Two or more sets may be used for large or bulky objects or containers where more than one point of contact is desired. Further, the present invention may be affixed to any surface of an object or container where a handhold is desired.

Figure 3:
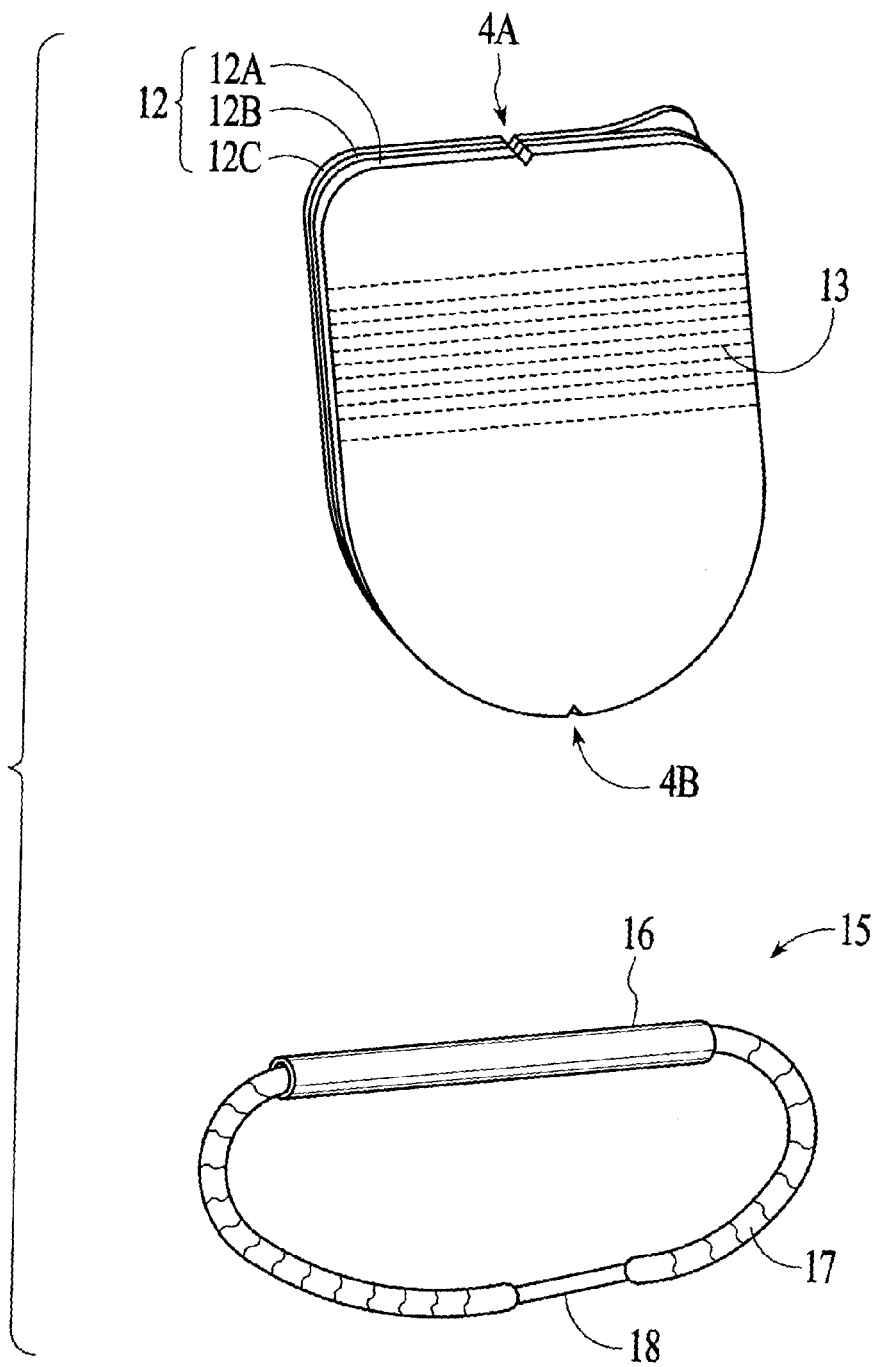
FIG. 3 shows the elements of a second embodiment of the invention prior to forming and assembly.
Figure 4:
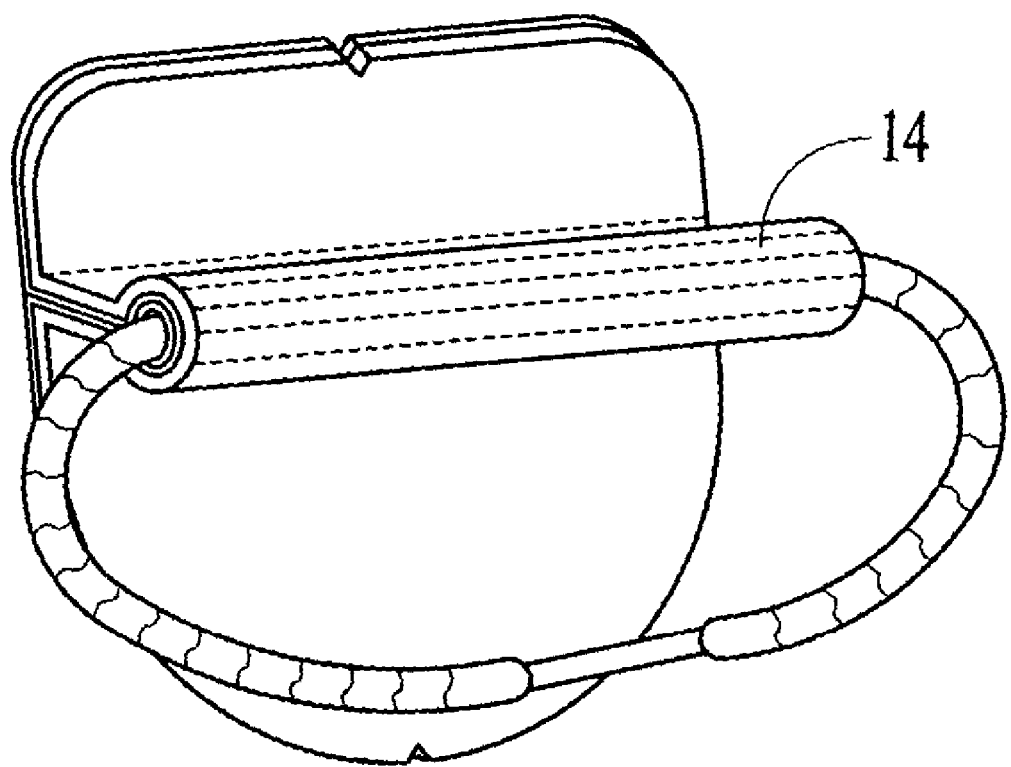
FIG. 4 is a perspective view of the embodiment shown in FIG. 3 after assembly.

FIG. 3 and FIG. 4 illustrate a second embodiment of the present invention. The Frame Part 12 is a flexible material 12A backed by adhesive layer 12B and protective layer 12C having two positioning notches 4A and 4B to aid in placing the handle frame set 12 on an object or container in a desired orientation as shown in FIG. 2. Multiple lines 13 are scored to facilitate bending and forming of handle part 14 to enclose a handle piece 15. In the embodiment shown, Handle Piece 15 has a stiff cylindrical small-diameter tube 16 enclosing a flexible cording 17 or other suitable material joined and secured by a clasp 18 to form a circular handle. Clasp 18 may be exposed as illustrated or concealed within stiff cylindrical small-diameter tubing 16. Flexible cording 17 is freely moveable within the stiff cylindrical small-diameter tubing 16. Protective layer 12C is removed, Frame Part 12 is bent at multiple lines 13 to enclose Handle Piece 15 and form Handle Part 14. The assembled Handle Frame set as shown in FIG. 4 is ready for attachment to an object or container as illustrated by the embodiment shown in FIG. 2.

Figure 5:
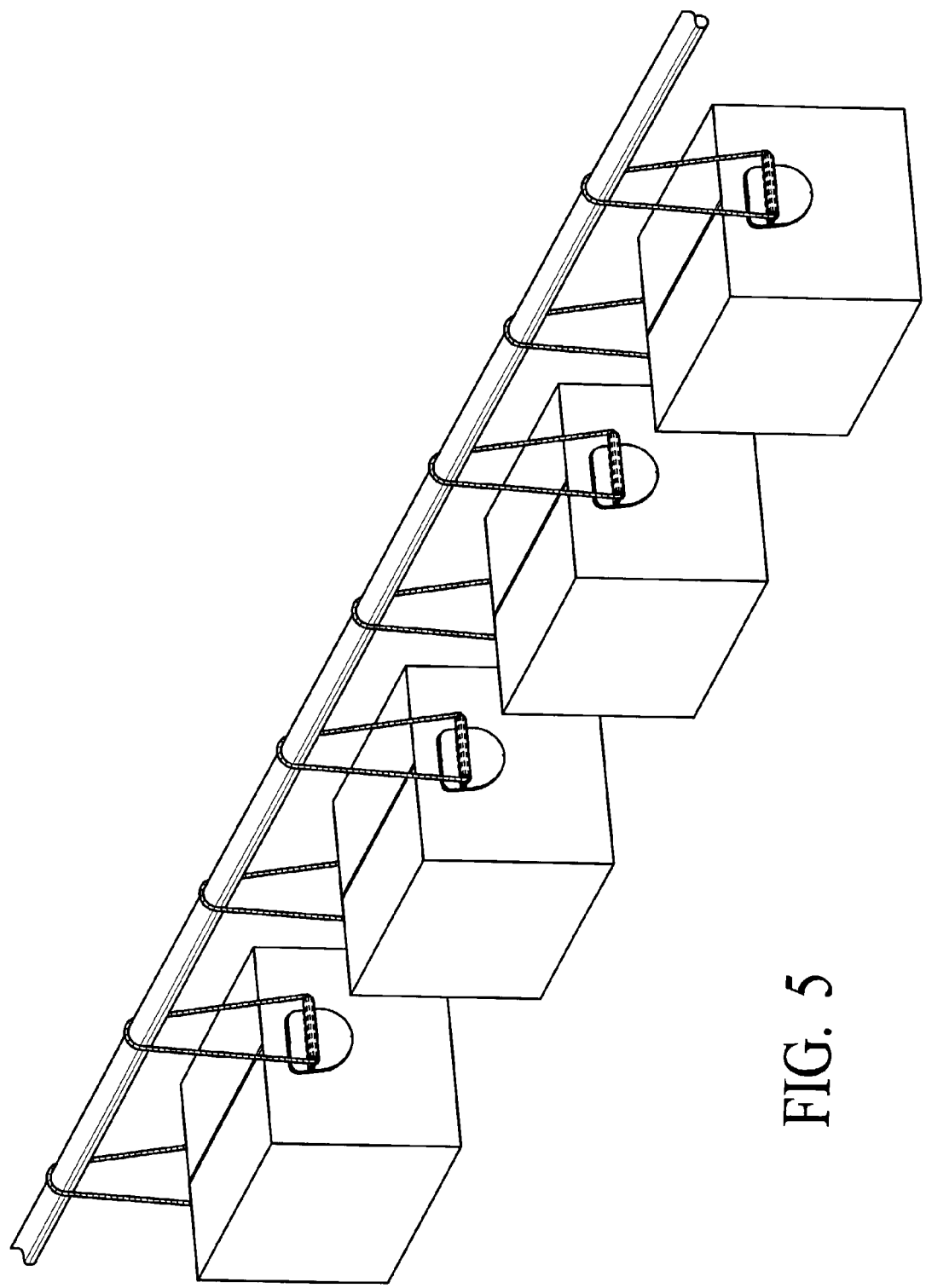
FIG. 5 shows the embodiment illustrated in FIG. 4 with elongated handles through which a rod is inserted for ease in carrying multiple objects.

The flexible cording 17 of Handle Piece 15 may be lengthened to allow a rod or similar carrying device to be inserted as shown in FIG. 5. Thusly, multiple objects or containers may be carried easily with economy of scale. Further, the Handle Part 14 may be pressed against the object or container to save space and avoid damage.

Figure 6:
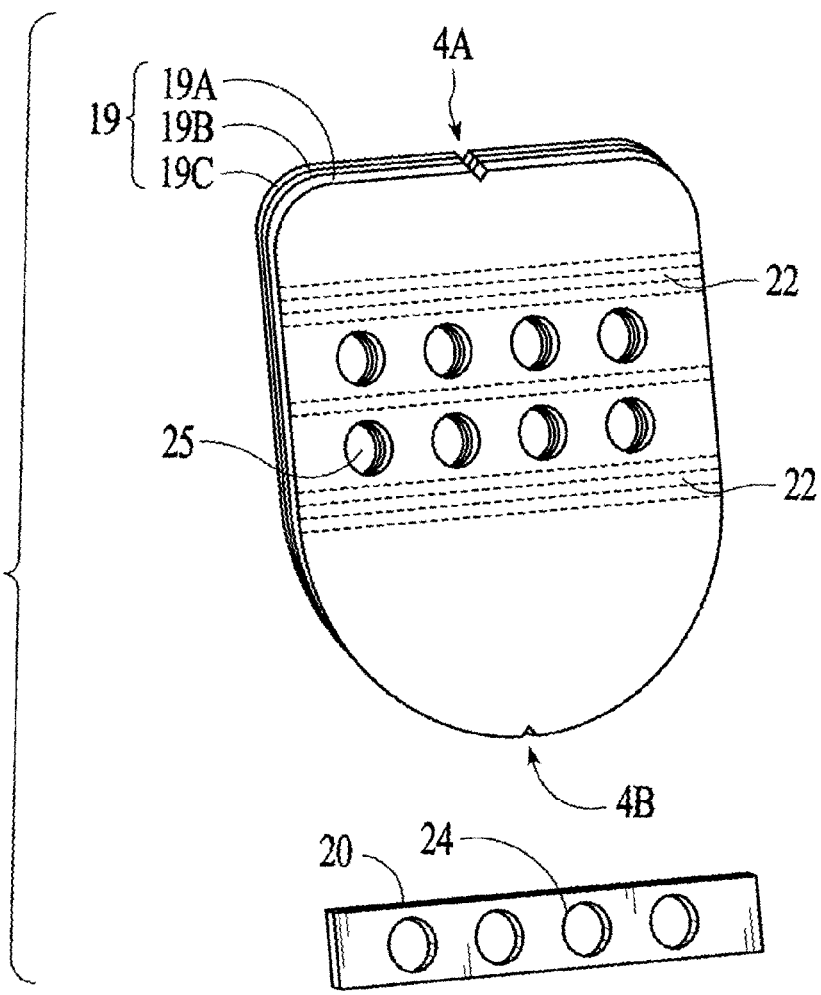
FIG. 6 shows the elements of a third embodiment of the invention prior to forming and assembly.
Figure 7:
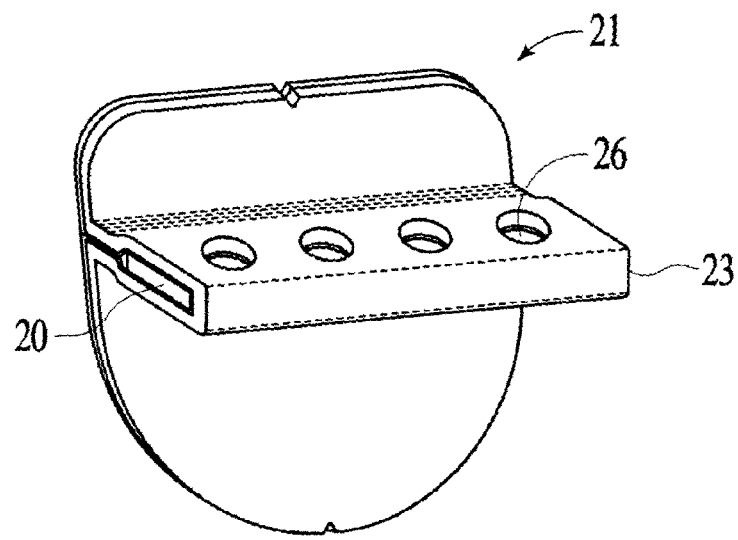
FIG. 7 is a perspective view of the embodiment shown in FIG. 6 assembly.

FIG. 6 and FIG. 7 illustrate a third embodiment of the present invention. Referring to FIG. 6, Frame Part 19 is a flexible material 19A backed by adhesive layer 19B and protective layer 19C having two positioning notches 4A and 4B to aid in placing the assembled handle frame set 21 on an object or container in a desired orientation. Prior to assembly of Handle Frame Set 21, protective layer 19C is removed. Multiple lines 22 are scored to facilitate bending and forming of handle part 23 to enclose a reinforcing handle piece 20. Reinforcing Handle Piece 20 is secured by the adhesive layer 19B of Frame Part 19. In this embodiment Reinforcing Handle Piece 20 is shown with four holes 24 corresponding with holes 25 in Frame Part 19 to form finger holds 26 in the assembled handle frame set 21 as illustrated in FIG. 7. Alternate configurations suitable for allowing the grasping and holding of handle part 23 may be employed including three holes rather than four, two holes and a slit, or other such configuration.

The assembled Handle Frame set 21 is ready for attachment to an object or container as illustrated by the embodiment shown in FIG. 2.

I claim:

1. A handle-frame set for attachment to a container or a bulky object, comprising:
   a frame part having a back side, a front side, an upper portion, a lower portion and an outer edge;
   a handle part having a back side, a front side and an upper and a lower portion formed by displacement of said lower portion of said frame part;
   an adhesive layer having a back side and a front side with said front side affixed on said back side of said frame part and said handle part;
   a protective layer having a back side and a front side with said front side releaseably affixed to said back side of said adhesive layer; and
   a set of folding lines located on said handle part;
   a set of aligning keys having a shape defined by cuts through said frame part, said adhesive layer and said protective layer;
   a set of aligning sockets having a shape defined by cuts through said frame part, said adhesive layer and said protective layer;
   a set of aligning shapes having a shape defined by cuts through said frame part, said adhesive layer and said protective layer;
   a set of aligning holes having a shape defined by cuts through said frame part, said adhesive layer and said protective layer;
   a set of cut-away portions defined by cuts through said frame part, said adhesive layer and said protective layer, whereby said cut-away portions are detached from said handle-frame set and said aligning keys are fitted into said aligning sockets and said aligning shapes are fitted into said aligning holes for aligning said upper and said lower portions of said frame part and for forming said handle part; and, positioning marks on said upper and said lower portions of said frame part for use in positioning said handle-frame set on said container or said bulky object in a desired orientation.

2. A handle-frame set for attachment to a container or a bulky object to facilitate lifting and carrying of said container or bulky object, comprising:
   a frame part having a back side, a front side, an upper portion, a lower portion and an outer edge;
   a handle part having a back side, a front side and an upper and a lower portion formed by displacement of said lower portion of said frame part;
   an adhesive layer for attaching to a surface having a back side and a front side with said front side affixed on said back side of said frame part and said handle part;
   a protective layer having a back side and a front side with said front side releaseably affixed to said back side of said adhesive layer;
   a set of folding lines located on said handle part;
   a set of aligning keys having a shape defined by cuts through said front side and said back side of said frame part, said adhesive layer and said protective layer;
   a set of aligning sockets having a shape defined by cuts through said front side and said back side of said frame part, said adhesive layer and said protective layer;
   a set of aligning shapes having a shape defined by cuts through said front side and said back side of said frame part, said adhesive layer and said protective layer;
   a set of aligning holes having a shape defined by cuts through said front side and said back side of said frame part, said adhesive layer and said protective layer; and
   a set of cut-away portions defined by cuts through said front side and said back side of said frame part, said adhesive layer and said protective layer, whereby said cut-away portions are detached from said handle-frame set and said aligning keys are then fitted into said aligning sockets and said aligning shapes are then fitted into said aligning boles for aligning said upper and said lower portions of said frame part and for forming said handle part.

3. A handle-frame set for attachment to a container or a bulky object to facilitate lifting and carrying of said container or bulky object, comprising:

a frame part having a back side, a front side, an outer edge, an upper portion and a lower portion, wherein said frame part has positioning marks on said upper and said lower portions of said frame part for use in positioning said handle-frame set on said container or said bulky object in a desired orientation;

a handle part having a back side, a front side and an upper and a lower portion formed by displacement of said lower portion of said frame part wherein said handle part encloseably holds a small diameter tubing composed of cardboard, wood, plastic, plastic composite, glass, fiber composite, metals, painted or anodized metal singly or in combination, said tubing containing a flexible cording, said cording forming a graspable handle comprised of plastic or cotton rope, metal wire, metal wire with wooden, cardboard, or plastic molded handle, singly or in combination;

an adhesive layer for attaching to a surface having a back side and a front side with said front side affixed on said back side of said frame part and said handle part;

a protective layer having a back side and a front side with said front side releaseably affixed to said back side of said adhesive layer;

a set of folding lines located on said handle part.

* * * * *